US010457386B2

(12) United States Patent
Luce et al.

(10) Patent No.: US 10,457,386 B2
(45) Date of Patent: Oct. 29, 2019

(54) HYDRAULIC SHIMMY DAMPER

(71) Applicant: GOODRICH CORPORATION, Charlotte, NC (US)

(72) Inventors: William E. Luce, Colleyville, TX (US); Poly Puthur John, Karnataka (IN); Anupkumar Salunke, Ponda (IN)

(73) Assignee: GOODRICH CORPORATION, Charlotte, NC (US)

( * ) Notice: Subject to any disclaimer, the term of this patent is extended or adjusted under 35 U.S.C. 154(b) by 12 days.

(21) Appl. No.: 15/699,644

(22) Filed: Sep. 8, 2017

(65) Prior Publication Data

US 2019/0016447 A1 Jan. 17, 2019

(30) Foreign Application Priority Data

Jul. 13, 2017 (IN) .............................. 201711024784

(51) Int. Cl.
*B64C 25/50* (2006.01)
*F16F 13/00* (2006.01)
*F16F 9/36* (2006.01)
*F16F 9/18* (2006.01)
*B64C 25/60* (2006.01)

(52) U.S. Cl.
CPC ............ *B64C 25/505* (2013.01); *B64C 25/60* (2013.01); *F16F 9/18* (2013.01); *F16F 9/361* (2013.01); *F16F 13/007* (2013.01); *F16F 2230/10* (2013.01)

(58) Field of Classification Search
CPC .. F16F 9/18; F16F 9/361; F16F 13/007; F16F 2230/10; B64C 25/505
See application file for complete search history.

(56) References Cited

U.S. PATENT DOCUMENTS 3,101,937 A * 8/1963 Stearns ................. F16F 13/002
217/52
3,499,621 A 3/1970 Boehringer et al.
4,638,895 A 1/1987 Taylor et al.
(Continued)

FOREIGN PATENT DOCUMENTS

EP 0414508 A1 2/1991
WO 2012012904 A1 2/2012

OTHER PUBLICATIONS

Anonymous, "no title", URL <http://www.taylordevices.com/>, retrieved Sep. 8, 2017, 2 pages.
(Continued)

*Primary Examiner* — Melanie Torres Williams
(74) *Attorney, Agent, or Firm* — Cantor Colburn LLP

(57) ABSTRACT

A damper is provided for responding to relative movement of arms to which the damper is coupled. The damper includes a member, springs, a first housing and a second housing. The first housing includes a first body and first bellows affixed to the member and the first body by first joints to define a first interior. The second housing includes a second body and second bellows affixed to the member and the second body by second joints to define a second interior. The first and second interiors are configured to contain fluid charged therein and the member is configured to permit bi-directional flows of the fluid between the first and second interiors responsive to the relative movement of the arms and in opposition to an elasticity of the springs.

7 Claims, 4 Drawing Sheets

(56) References Cited

U.S. PATENT DOCUMENTS

| | | | |
|---|---|---|---|
| 4,768,627 A | 9/1988 | Taylor | |
| 4,815,574 A | 3/1989 | Taylor et al. | |
| 5,224,668 A | 7/1993 | Boehringer | |
| 5,318,156 A * | 6/1994 | Davis | F16F 9/10 188/298 |
| 5,332,070 A | 7/1994 | Davis et al. | |
| 5,487,454 A | 1/1996 | Klembczyk et al. | |
| 6,216,831 B1 | 4/2001 | Taylor | |
| 6,345,707 B1 | 2/2002 | Klembczyk | |
| 6,615,959 B2 | 9/2003 | Eroshenko | |
| 8,327,985 B2 * | 12/2012 | Boyd | F16F 9/16 188/298 |
| 8,480,026 B2 | 7/2013 | Luce | |
| 9,273,749 B2 * | 3/2016 | Goold | F16F 13/00 |
| 9,352,827 B2 | 5/2016 | Besliu | |
| 9,371,883 B2 | 6/2016 | Wehr et al. | |

OTHER PUBLICATIONS

Search Report dated Nov. 14, 2018 in EP Application No. 18183423. 5, 9 pages.

* cited by examiner

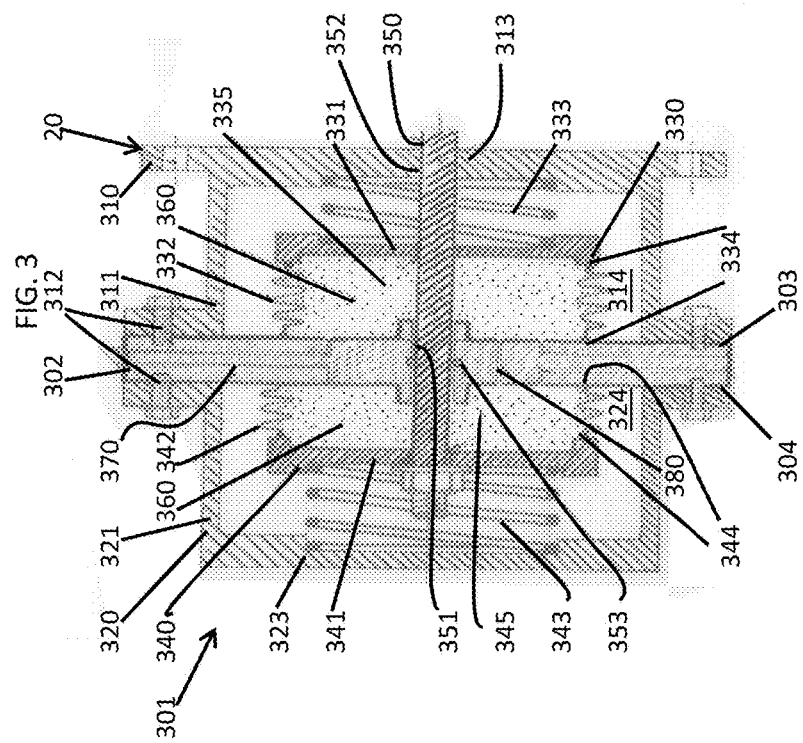
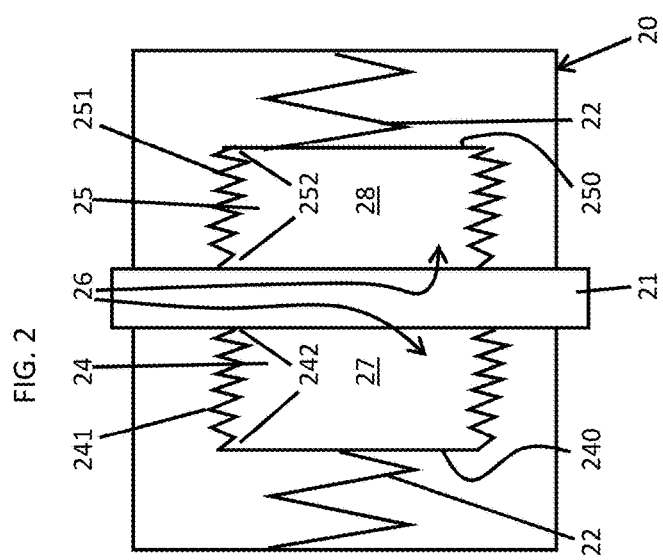

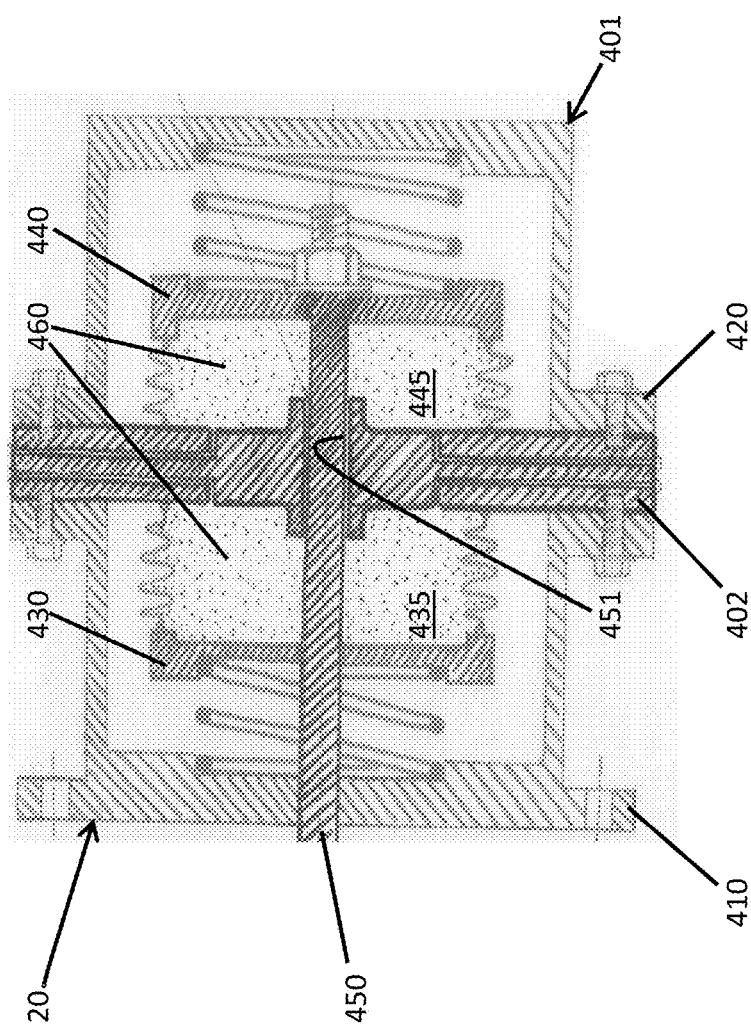

HYDRAULIC SHIMMY DAMPER

CROSS-REFERENCE TO RELATED APPLICATIONS

This application claims priority to and the benefit of Indian Patent Application No. 201711024784 filed on Jul. 13, 2017, and all the benefits accruing therefrom under U.S.C. § 119, the content of which is incorporated herein in its entirety by reference.

BACKGROUND

The following description relates to shimmy damping and, more specifically, to a maintenance free hydraulic shimmy damper.

A shimmy damper assembled to a landing gear unit of an aircraft operates by dissipating vibration energy induced during taxiing, landing and take-off procedures. For example, upper and lower torque links of a landing gear are typically connected to a shimmy damper and torsional vibration displacement from the proximal piston is transferred to an outer cylinder through the upper and lower torque links. The shimmy damper is mounted at the apex joint of the upper and lower torque links and provides damping to counteract the torsional vibration displacement.

A conventional shimmy damper includes a damping piston, a cylinder and a reservoir housing. The damping piston includes radial seals which define multiple chambers within the cylinder. Hydraulic oil flows from the reservoir housing to the multiple chambers through non-return valves. Damping is achieved by the viscous friction force when the hydraulic oil flows across the multiple chambers through a restrictor orifice in opposition to the torsional vibration displacement.

With the vibrational energy dissipated by the flow of hydraulic oil, the dissipated energy is converted into heat energy and causes a temperature of the damper to increase. Moreover, the high number of parts of the damper provides for increased numbers of failure modes and fluid leakage.

BRIEF DESCRIPTION

According to an aspect of the disclosure, a damper is provided for responding to relative movement of arms to which the damper is coupled. The damper includes a member, springs, a first housing and a second housing. The first housing includes a first body and first bellows affixed to the member and the first body by first joints to define a first interior. The second housing includes a second body and second bellows affixed to the member and the second body by second joints to define a second interior. The first and second interiors are configured to contain fluid charged therein and the member is configured to permit bi-directional flows of the fluid between the first and second interiors responsive to the relative movement of the arms and in opposition to an elasticity of the springs.

In accordance with additional or alternative embodiments, the first interior is bound by the member, the first body, the first bellows and the first joints and the second interior is bound by the member, the second body, the second bellows and the second joints.

According to another aspect of the disclosure, a damper is provided. The damper includes a disc, first and second housings defining first and second interiors at opposite disc sides, respectively, the first housing configured to be coupled with a first arm, first and second bodies respectively disposed within the first and second interiors and respectively comprising collars, bellows connecting the collars to the disc to form third and fourth interiors and springs anchored between the first and second housings and the collars and a rod configured to be coupled with a second arm, affixed to the first and second bodies and extended through the disc and the first housing. The rod and the first housing are relatively movable with relative movement of the first and second arms and the third and fourth interiors are configured to contain fluid charged therein and to flow the fluid through the disc.

In accordance with additional or alternative embodiments, the disc is formed to define pluggable charge lines leading to the third and fourth interiors and the damper further includes a seal disposed between the rod and the disc.

In accordance with additional or alternative embodiments, the disc is formed to define a flow restrictor offset from a centerline thereof and through which the fluid flows.

In accordance with additional or alternative embodiments, the first and second interiors are exposed to external environmental conditions.

In accordance with additional or alternative embodiments, the bellows are welded to the opposite disc sides and the collars.

In accordance with additional or alternative embodiments, the respective volumes of the third and fourth interiors increase or decrease with the flow of the fluid through the disc and the springs elastically respond to the flow of the fluid through the disc.

In accordance with additional or alternative embodiments, the rod is welded to at least one of the first and second bodies.

According to yet another aspect of the disclosure, a damper is provided and includes seals, bellows, a first body and a second body. The second body is movable and rotatable relative to the first body with relative rotation and pivoting of arms to which the first and second bodies are coupled. The first body defines a reservoir and the first and second bodies cooperatively define a first cavity and a second cavity. The first cavity is bi-directionally fluidly communicative with the reservoir and bound by respective components of the first and second bodies and the bellows. The second cavity is encompassed by the first cavity, uni-directionally fluidly communicative with the reservoir and bi-directionally fluidly communicative with the first cavity with movement of the second body relative to the first body, bound by the respective components of the first and second bodies and the seals and configured to elastically oppose fluid communication between the first and second cavities.

In accordance with additional or alternative embodiments, the components of the first body include a rotor portion and first, second and third members extending radially outwardly from the rotor portion and the components of the second body include a first wall extending between the first and third members, a fourth member extending radially inwardly from the first wall to the second member, a second wall extending axially from the fourth member and fifth and sixth members extending radially inwardly from the second wall to the rotor portion.

In accordance with additional or alternative embodiments, the third member is formed to define the reservoir.

In accordance with additional or alternative embodiments, the seals are disposed between the second wall and the second, fifth and sixth members and include second seals disposed between the rotor portion and the fifth and sixth members.

In accordance with additional or alternative embodiments, the bellows include first bellows extending axially from the fourth member to the first member and second bellows extending axially from the fourth member to the third member.

In accordance with additional or alternative embodiments, the damper further includes scrapers disposed at interfaces between the first wall and the first and third members.

In accordance with additional or alternative embodiments, the bellows include metallic materials.

In accordance with additional or alternative embodiments, the second body includes springs disposed to elastically oppose the fluid communication between the first and second cavities.

In accordance with additional or alternative embodiments, the first body defines through-holes by which the first cavity is bi-directionally fluidly communicative with the reservoir.

In accordance with additional or alternative embodiments, the dampers further include check valves disposed along lines extending between the reservoir and the second cavity and the check valves permit the uni-directional fluid communication between the second cavity and the reservoir.

In accordance with additional or alternative embodiments, the second body defines orifices by which the second cavity is bi-directionally fluidly communicative with the first cavity.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 2 is a schematic illustration of a damper for use with the landing gear of FIG. 1 in accordance with embodiments;

FIG. 3 is a cross-sectional illustration of a damper for use with the landing gear of FIG. 1 in accordance with embodiments;

FIG. 4 is a cross-sectional illustration of a damper for use with the landing gear of FIG. 1 in accordance with alternative embodiments.

DETAILED DESCRIPTION

As will be described below, a simplified hydraulic damper is provided. The hydraulic damper includes cavities formed within metallic bellows in which the fluid medium is self-contained.

Figure 1:
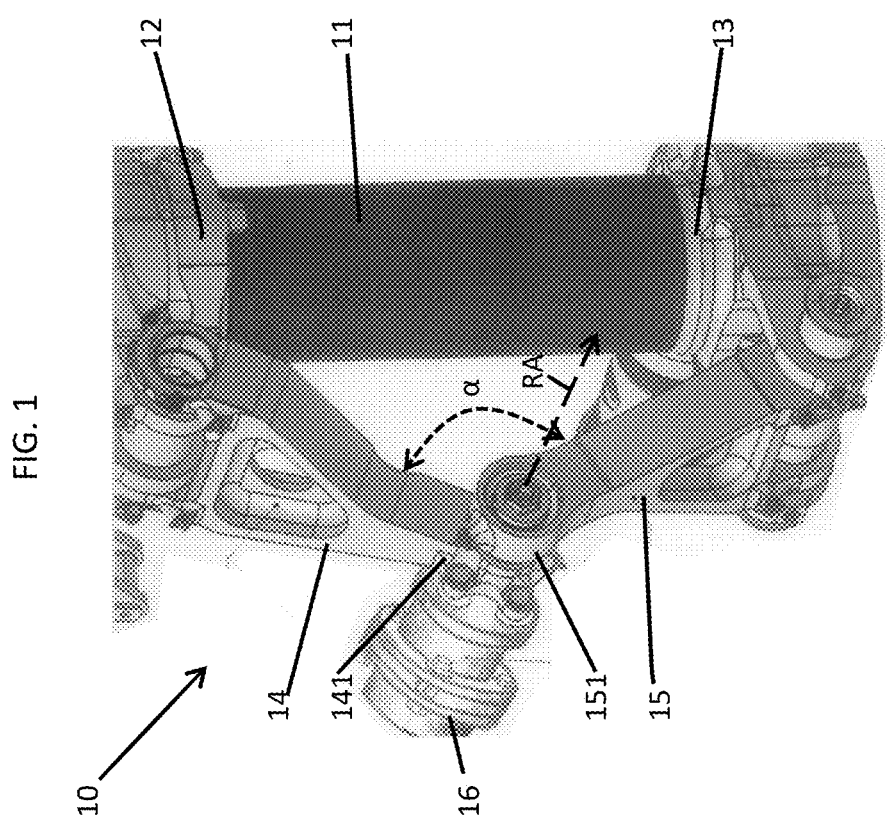
FIG. 1 is a perspective view of a landing gear including a piston and first and second torque arms in accordance with embodiments.

With reference to FIG. 1, a landing gear 10 is provided for use with an aircraft, such as a plane or a helicopter. The landing gear 10 includes a pneumatic piston 11, an upper hub 12 which is disposed at an upper portion of the piston 11, a lower hub 13 which is disposed below the upper hub 12 at a lower portion of the piston 11, a first torque arm 14, a second torque arm 15 and a damper 16. The first torque arm 14 extends at a downward angle from the upper hub 12 and the second torque arm 15 extends at an upward angle from the lower hub 13. The damper 16 serves to couple respective distal ends 141 and 151 of the first and second torque arms 14 and 15.

During certain operations of the landing gear 10 in which a load (e.g., a portion of the weight of an aircraft) is applied to the landing gear 10, the upper and lower hubs 12 and 13 are forced toward one another along a central longitudinal axis of the piston 11. In such cases, an angle α that is defined by the first and second torque arms 14 and 15 decreases as the first and second torque arms 14 and 15 and the respective distal ends 141 and 151 responsively rotate about a common rotational axis RA which is defined through the respective distal ends 141 and 151 of the first and second torque arms 14 and 15 and the damper 16. During other operations of the landing gear 10, such as when the aircraft is driven along the ground during a taxiing event, the landing gear 10 experiences a shimmy in which the upper and lower hubs 12 and 13 exhibit relative rotational displacement about the central longitudinal axis of the piston 11. In such cases, the respective distal ends 141 and 151 of the first and second torque arms 14 and 15 move relative to one another along the common rotational axis RA.

The damper 16 is thus configured to dampen the relative movement of the respective distal ends 141 and 151 along the common rotation axis RA while permitting relative rotation of the respective distal ends 141 and 151 about the common rotational axis RA.

To this end, conventional dampers were provided with interiors that were fluidly communicative with each other and with fluid reservoirs. Fluid from the fluid reservoirs would be driven into the interiors whereupon the fluid could move between the interiors in a manner that would dampen the relative movement of the distal ends of the torque arms. Such configurations were problematic however because the interiors were typically sealed with seals that were prone to leakage and because the reservoir-to-interior movement of fluid was similarly prone to leakage.

Therefore, with reference to FIGS. 2-5, various embodiments of damper 20 are provided for responding to relative movement of torque arms (i.e., the distal ends 141 and 151 of the torque arms 14 and 15 of FIG. 1) to which the damper 20 is coupled.

As shown in FIG. 2, the damper 20 includes a member 21, springs 22, a first housing 24, a second housing 25 and fluid 26. The springs 22 are respectively connected to the first and second housings 24 and 25. The first housing 24 includes a first body 240 and first bellows 241. The first bellows 241 are affixed to a corresponding side of the member 21 and to the first body 240 by first joints 242 to define a first interior 27. The first bellows 241 may be formed of metallic materials. The first joints 242 may be provided as weld joints or as another type of joint which is impermeable with respect to the fluid 26. The second housing 25 includes a second body 250 and second bellows 251. The second bellows 251 are affixed to a corresponding side of the member 21 and to the second body 250 by second joints 252 to define a second interior 28. The second bellows 251 may be formed of metallic materials. The second joints 252 may be provided as weld joints or as another type of joint which is impermeable with respect to the fluid 26.

With the construction described above, the first interior 27 is bound by a first side of the member 21, the first body 240, the first bellows 241 and the first joints 242 and the second interior 28 is bound by a second side of the member 21, which is opposite the first side of the member 21, the second body 250, the second bellows 251 and the second joints 252.

At an initial time, the fluid 26 is charged into and thereafter contained within the first and second interiors 27 and 28. The member 21 is configured to permit bi-directional flows of the fluid 26 between the first and second interiors 27 and 28 in response to the relative movement of the arms and in opposition to an elasticity of the springs 22. As such, during operations of the damper 20, in an event the relative movement of the arms compresses the first interior 27 such that a volume of the first interior 27 decreases, fluid 26 charged in the first interior 27 flows through the member 21 and into the second interior 28 such that the second interior 28 expands and a volume of the second interior 28 increases. Meanwhile, the elasticity of the springs 22 opposes the compression of the first interior 27 and the expansion of the second interior 28 such that the original first interior-to-second interior movement of the fluid 26 is reversed whereupon the damper 20 returns (eventually) to its normal condition. Conversely, in an event the relative movement of the arms compresses the second interior 28 such that a volume of the second interior 28 decreases, fluid 26 charged in the second interior 28 flows through the member 21 and into the first interior 27 such that the first interior 27 expands and a volume of the first interior 27 increases. Meanwhile, the elasticity of the springs 22 opposes the compression of the second interior 28 and the expansion of the first interior 27 such that the original second interior-to-first interior movement of the fluid 26 is reversed whereupon the damper 20 returns (eventually) to its normal condition.

With reference to FIG. 3, a damper 301 is provided for use with the landing gear 10 and the first and second torque arms 14 and 15 of FIG. 1. The damper 301 includes a cavity isolation disc 302, which has a first side 303 and a second side 304 that is opposite the first side 303. The damper 301 further includes a first housing 310 and a second housing 320, a first body 330 and a second body 340, a rod 350 and fluid 360.

The first housing 310 includes sidewalls 311 that are affixed to the first side 303 of the cavity isolation disc 302 by fastening members and an end wall 313. The end wall 313 is integrally coupled to the sidewalls 311 and may be coupled with the first torque arm 14 of FIG. 1. The sidewalls 311 and the end wall 313 define a first interior 314 at the first side 303 of the cavity isolation disc 302. The first interior 314 may be but is not required to be sealed from an external atmosphere. That is, the first interior 314 may be exposed to external atmospheric conditions. The end wall 313 is generally flat but may be formed to define a recess at a side thereof facing the first interior 314. The second housing 320 includes sidewalls 321 that are affixed to the first side 304 of the cavity isolation disc 302 by fastening members and an end wall 323. The end wall 323 is integrally coupled to the sidewalls 321. The sidewalls 321 and the end wall 323 define a second interior 324 at the second side 304 of the cavity isolation disc 302. The second interior 324 may be but is not required to be sealed from an external atmosphere. That is, the second interior 324 may be exposed to external atmospheric conditions. The end wall 323 is generally flat but may be formed to define a recess at a side thereof facing the second interior 324.

The first body 330 is disposed within the first interior 314. The first body 330 includes a collar 331, bellows 332 and a spring (e.g., a compression spring) 333. The collar 331 is a generally rigid feature that may be formed of a metallic material. Each of the bellows 332 may be formed of metallic materials that are welded at first ends thereof to the collar 331 and at second ends thereof to the first side 303 of the cavity isolation disc 302 to form joints 334. As such, the first body 330 defines within the first interior 314 a third interior 335, which is bound by the first side 303 of the cavity isolation disc 302, the collar 331, the bellows 332 and the joints 334. The bellows 332 are provided in a corrugated configuration such that the bellows 332 can assume a normal condition, a contracted condition in which the third interior 335 has a decreased volume with the collar 331 being relatively close to the cavity isolation disc 302 and an extended condition in which the third interior 335 has an increased volume with the collar being relatively far from the cavity isolation disc 302. The spring 333 is anchored at a first end thereof to the end wall 313 at the recess and at a second end thereof to a side of the collar 331 facing away from the third interior 335.

The second body 340 is disposed within the second interior 324. The second body 340 includes a collar 341, bellows 342 and a spring (e.g., a compression spring) 343. The collar 341 is a generally rigid feature that may be formed of a metallic material. Each of the bellows 342 may be formed of metallic materials that are welded at first ends thereof to the collar 341 and at second ends thereof to the second side 304 of the cavity isolation disc 302 to form joints 344. As such, the second body 340 defines within the second interior 324 a fourth interior 345, which is bound by the second side 304 of the cavity isolation disc 302, the collar 341, the bellows 342 and the joints 344. The bellows 342 are provided in a corrugated configuration such that the bellows 342 can assume a normal condition, a contracted condition in which the fourth interior 345 has a decreased volume with the collar 341 being relatively close to the cavity isolation disc 302 and an extended condition in which the fourth interior 345 has an increased volume with the collar being relatively far from the cavity isolation disc 302. The spring 343 is anchored at a first end thereof to the end wall 323 at the recess and at a second end thereof to a side of the collar 341 facing away from the fourth interior 345.

The rod 350 may be coupled with the second torque arm 15 of FIG. 1 and is affixed to at least one or both of the first and second bodies 330 and 340 and extended through an aperture 351 defined in the cavity isolation disc 302 and through aperture 352 defined in the first housing 310. In accordance with embodiments, the rod 350 may be welded to the collars 331 and 341 and, as shown in FIG. 3, may be engaged with seal (e.g., O-ring) 353. The seal 353 is interposed between the cavity isolation disc 302 and the rod 350 at the aperture 351 to prevent fluid flow between the third and fourth interiors 335 and 345.

The cavity isolation disc 302 may be formed to define pluggable charge lines 370 and a flow restrictor 380. The pluggable charge lines 370 extend from an end of the cavity isolation disc 302 to the third and fourth interiors 335 and 345 and permit the fluid 360 to be charged in the third and fourth interiors 335 and 345 (the pluggable charge lines 370 are plugged once the fluid 360 is charged in the third and fourth interiors 335 and 345 whereby fluid flow through the pluggable charge lines 370 is prevented). The flow restrictor 380 extends through the cavity isolation disc 302 and is offset from a centerline thereof and/or from the aperture 351.

With the configuration described above and with the first housing 310 coupled to the first torque arm 14 of FIG. 1 and the rod 350 coupled to the second torque arm 15 of FIG. 1, it is to be understood that the rod 350 and the first housing 310 are movable relative to one another in correspondence with relative movement of the first and second torque arms 14 and 15 about the central longitudinal axis of the piston 11 of FIG. 1 resulting from a shimmy incident. The fluid 360, which is charged into the third and fourth interiors 335 and 345 is thus permitted to flow through the flow restrictor 380 of the cavity isolation disc 302 in response to this relative movement of the rod 350 and the first housing 310 and in opposition to the elasticity of the springs 333 and 343 to thereby dampen the relative movement of the first and second torque arms 14 and 15 resulting from the shimmy incident.

During operations of the damper 301, in an event the relative movement of the first and second torque arms 14 and 15 leads to relative movement of the first housing 310 and the rod 350 which compresses the third interior 335 such that a volume of the third interior 335 decreases, the fluid 360 that is charged in the third interior 335 flows through the flow restrictor 380 of the cavity isolation disc 302 and into the fourth interior 345 such that the fourth interior 345 expands and a volume of the fourth interior 345 increases. Meanwhile, the elasticity of the spring 343 opposes the compression of the third interior 335 and the expansion of the fourth interior 345 such that the original third interior-to-fourth interior movement of the fluid 360 is reversed whereupon the damper 301 returns (eventually) to its normal condition.

Conversely, in an event the relative movement of the first and second torque arms 14 and 15 leads to relative movement of the first housing 310 and the rod 350 which compresses the fourth interior 345 such that a volume of the fourth interior 345 decreases, the fluid 360 that is charged in the fourth interior 345 flows through the flow restrictor 380 of the cavity isolation disc 302 and into the third interior 335 such that the third interior 335 expands and a volume of the third interior 335 increases. Meanwhile, the elasticity of the spring 333 opposes the compression of the fourth interior 345 and the expansion of the third interior 335 such that the original fourth interior-to-third interior movement of the fluid 360 is reversed whereupon the damper 301 returns (eventually) to its normal condition.

With reference to FIG. 4 and, in accordance with alternative embodiments of a damper 401, a cavity isolation disc 402 may not be formed to define a flow restrictor and may not include a seal. Rather, the aperture 451 may be formed large enough such that the flow of the fluid 460 between the third and fourth interiors 435 and 445 (of the first and second housings 410 and 420 and the first and second housings 430 and 440) is possible through the aperture 451 and around the outer surface of the rod 450.

Figure 5:
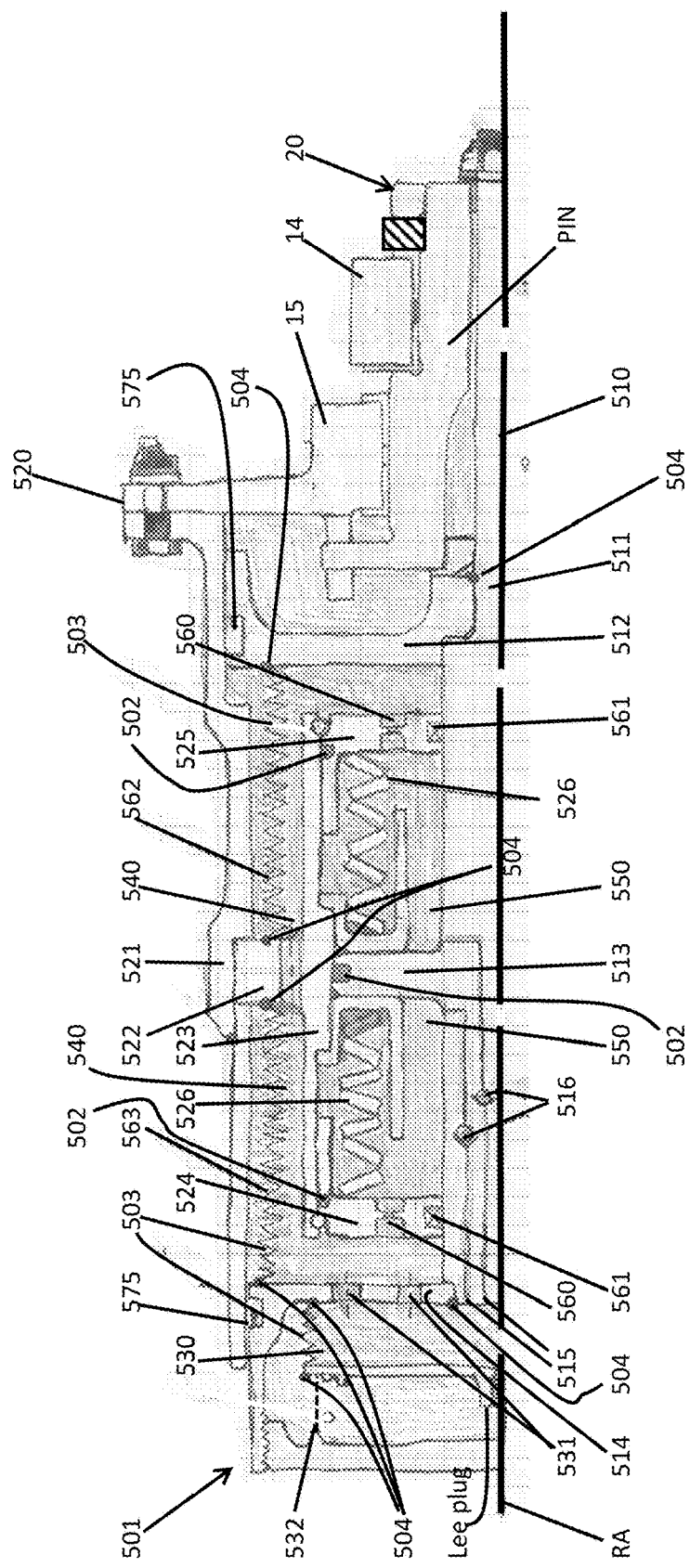
FIG. 5 is a cross-sectional illustration of a damper for use with the landing gear of FIG. 1 in accordance with embodiments.

With reference to FIG. 5, a damper 501 is provided for use with the landing gear 10 and the first and second torque arms 14 and 15 of FIG. 1. The damper 501 includes seals 502, bellows 503 formed of metallic materials, a first body 510, which may be coupled to the first torque arm 14 of FIG. 1, and a second body 520, which may be coupled with the second torque arm 15 of FIG. 1. The first body 510 is movable along the common rotational axis RA (see FIGS. 1 and 5) relative to the second body 520 in correspondence with relative rotation of the first and second torque arms 14 and 15 about the central longitudinal axis of the piston 11 during a shimmy incident. The first body 510 is also rotatable relative to the second body 520 in correspondence with relative pivoting of the first and second torque arms 14 and 15 about the common rotational axis RA. The first body 510 is formed to define a reservoir 530. The first and second bodies 510 and 520 are formed to cooperatively define a first cavity 540 and a second cavity 550.

In accordance with embodiments and, as shown in FIG. 5, the components of the first body 510 include a rotor portion 511 that extends along the common rotational axis RA and first, second and third members 512, 513 and 514 that extend radially outwardly from the rotor portion 511. The components of the second body 520 include a first wall 521 that extends between at least the first and third members 512 and 514 of the first body 510, a fourth member 522 that extends radially inwardly from the first wall 521 to the second member 513, a second wall 523 that extends axially from the fourth member 522 and fifth and sixth members 524 and 525 that extend radially inwardly from the second wall 523 to the rotor portion 511. The second body 520 also includes springs 526. The springs 526 are anchored at distal ends thereof to the fifth and sixth members 524 and 525 and at proximal ends thereof to the second member 513. The fifth and sixth members 524 and 525 are formed to define orifices 560 by which the second cavity 550 is bi-directionally fluidly communicative with the first cavity 540.

In accordance with further embodiments, the rotor portion 511 is formed to define fluid passages 515 that extend between the reservoir 530 and the second cavity 550 and includes check valves 516 that are disposed along the fluid passages 515 to permit fluid flow from the reservoir 530 to the second cavity 550 but prevent fluid flow in the other direction. The third member 514 may be formed to define the reservoir 530 as well as through-holes 531 by which the reservoir 530 is bi-directionally fluidly communicative with the first cavity 540. The seals 502 are disposed between the second wall 523 and the fifth and sixth members 524 and 525 and include second seals 561 that are disposed between the rotor portion 511 and the fifth and sixth members 524 and 525. The bellows 503 may include first bellows 562 extending axially from the fourth member 522 to the first member 512 and second bellows 563 extending axially from the fourth member 522 to the third member 514. In accordance with still further embodiments, the damper 501 may include scrapers 575 disposed at interfaces between the first wall 521 and the first and third members 512 and 514.

The reservoir 530 is supported by a spring 532 and bellows 503. The spring 532 assists in maintaining fluid pressure within the first and second cavities 540 and 550. The bellows 503 prevent fluid flow out of either the first cavity 540 or the second cavity 550. Fluid, such as oil, fills the reservoir 530 and then flows to other chambers through through-holes 531 and fluid passages 515.

The first cavity 540 is bi-directionally fluidly communicative with the reservoir 530 by way of the through-holes 531. The first cavity 540 is bound by the rotor portion 511 and the first and third members 512 and 514 of the first body 510, by the second wall 523 of the second body 520, the bellows 503 and by weld joints 504 formed between opposite ends of the first bellows 562 and the first and fourth members 512 and 522 and between opposite ends of the second bellows 563 and the third and fourth members 514 and 522.

The second cavity 550 is encompassed within the first cavity 540 and is uni-directionally fluidly communicative with the reservoir 530 by way of the fluid passages 515 and the check valves 516. The second cavity 550 is also bi-directionally fluidly communicative with the first cavity 540 by way of the orifices 560 with movement of the second body 520 relative to the first body 510 along the common rotational axis RA. In addition, the second cavity 550 is directly bound by the rotor portion 511, the second wall 523, the fifth and sixth members 524 and 525 and by the seals 502 and the second seals 561. The springs 526 extend through the second cavity 550 and are configured to elastically oppose fluid communication between the first and second cavities 540 and 550. The second cavity 550 is indirectly bound by the bounds of the first cavity 540.

During operations of the damper 501, in an event the relative motion of the first and second torque arms 14 and 15 leads to relative movement of the first body 510 and the second body 520 such that the second member 513 translates toward the sixth member 525, fluid charged out of the second cavity 550 between the second member 513 and the sixth member 525 flows outwardly to the first cavity 540 by way of the orifice 560 of the sixth member 525. With the reservoir 530 maintaining a fluid pressures of the first and second cavities 540 and 550 substantially stable, this causes a flow of fluid from the first cavity 540 into the second cavity 550 between the fifth member 524 and the second member 513 by way of the orifice 560 of the fifth member 524. It is unlikely the flow into the second cavity 550 can keep up with only orifice 560, so additional fluid may flow from the reservoir 530 to the second cavity 550 by way of the uni-directional check valves 516 in the fluid passages 515. The fluid flows in turn lead to a decrease of volume in the second cavity 550 between the second member 513 and the sixth member 525 and an increase in volume of the second cavity 550 between the second member 513 and the fifth member 524 that are respectively opposed in part by the springs 526. The above-described fluid flows operate in the reverse direction as well. In any case, none of the fluid escapes from the first cavity 540 or through the bellows 503, the bellows 562, the bellows 563 or the weld joints 504.

It is to be understood that the PIN in FIG. 5 may be provided as a structural component that holds the first and second torque arms 14 and 15 in a coaxial arrangement along the common rotational axis RA while allowing the first and second torque arms 14 and 15 to have limited motion along the common rotational axis RA. The damper 501 of FIG. 5 (i.e., a shimmy damper) thus operates within the limited motion allowed by the PIN. The PIN may also be keyed to rotate with the first torque arm 14 (or with the second torque arm 15) in which case the first body 510 (and thus the first, second and third members 512, 513 and 514) all may be permitted to move linearly along the common rotational axis RA with the PIN but are free to rotate independent of the PIN around the common rotational axis RA. The first body 510 (and thus the first, second and third members 512, 513 and 514) are all free to rotate independent of the second body 520 (and thus the first wall 521, the fourth member 522 and the second wall 523) around the common rotational axis RA.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A damper, comprising:
a disc;
first and second housings defining first and second interiors at opposite disc sides, respectively, the first housing configured to be coupled with a first arm;
first and second bodies respectively disposed within the first and second interiors and respectively comprising collars, bellows connecting the collars to the disc to form third and fourth interiors and springs anchored between the first and second housings and the collars; and
a rod configured to be coupled with a second arm, affixed to the first and second bodies and extended through the disc and the first housing,
wherein the rod and the first housing are relatively movable with relative movement of the first and second arms and the third and fourth interiors are configured to contain fluid charged therein and to flow the fluid through the disc.

2. The damper according to claim 1, wherein:
the disc is formed to define pluggable charge lines leading to the third and fourth interiors, and
the damper further comprises a seal disposed between the rod and the disc.

3. The damper according to claim 1, wherein the disc is formed to define a flow restrictor offset from a centerline thereof and through which the fluid flows.

4. The damper according to claim 1, wherein the first and second interiors are exposed to external environmental conditions.

5. The damper according to claim 1, wherein the bellows are welded to the opposite disc sides and the collars.

6. The damper according to claim 1, wherein respective volumes of the third and fourth interiors increase or decrease with the flow of the fluid through the disc and the springs elastically respond to the flow of the fluid through the disc.

7. The damper according to claim 1, wherein the rod is welded to at least one of the first and second bodies.

* * * * *